(12) United States Patent
Lumb

(10) Patent No.: US 8,266,430 B1
(45) Date of Patent: Sep. 11, 2012

(54) SELECTIVE SHREDDING IN A DEDUPLICATION SYSTEM

(75) Inventor: Christopher R. Lumb, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 1141 days.

(21) Appl. No.: 12/011,989

(22) Filed: Jan. 29, 2008

Related U.S. Application Data

(60) Provisional application No. 61/004,639, filed on Nov. 29, 2007.

(51) Int. Cl.
*H04L 29/06* (2006.01)
(52) U.S. Cl. ........... 713/165; 713/189; 713/193; 726/1; 726/28
(58) Field of Classification Search .................. 713/165, 713/193, 189
See application file for complete search history.

(56) References Cited

U.S. PATENT DOCUMENTS

| 7,840,537 B2* | 11/2010 | Gokhale et al. | 707/652 |
|---|---|---|---|
| 2006/0173985 A1* | 8/2006 | Moore | 709/223 |
| 2007/0116287 A1* | 5/2007 | Rasizade et al. | 380/258 |
| 2007/0300031 A1* | 12/2007 | Jevans et al. | 711/166 |
| 2008/0243878 A1* | 10/2008 | de Spiegeleer et al. | 707/100 |
| 2008/0281908 A1* | 11/2008 | McCanne et al. | 709/203 |
| 2009/0049260 A1* | 2/2009 | Upadhyayula | 711/162 |

\* cited by examiner

*Primary Examiner* — Carl Colin
*Assistant Examiner* — Mohammad Siddiqi
(74) *Attorney, Agent, or Firm* — Van Pelt, Yi & James LLP

(57) ABSTRACT

Making a target file impratical to be retrieved comprises decrypting a directory manager file using a first directory manager file key. The directory manager file includes an encryption key for a segment that is used when reconstructing a target file. The directory manager file is modified by deleting a reference to the target file. The reference includes a file encryption key. Retrieving the target file is made impractical by the deletion of the reference to the target file in the directory manager file. The modified directory manager file is encrypted using a second directory manager file key.

17 Claims, 16 Drawing Sheets

SELECTIVE SHREDDING IN A DEDUPLICATION SYSTEM

CROSS REFERENCE TO OTHER APPLICATIONS

This application claims priority to U.S. Provisional Patent Application No. 61/004,639 entitled SELECTIVE SHREDDING IN A DEDUPLICATION SYSTEM filed Nov. 29, 2007 which is incorporated herein by reference for all purposes.

BACKGROUND OF THE INVENTION

As more and more computer data is generated, there is a need for efficient and reliable data storage systems. In order to store data more efficiently, some storage systems break the computer data into segments and deduplicate the storage of the segments; before storing each segment, the storage system checks if the segment has been previously stored, and if it has been previously stored, a reference to the previously stored segment is stored instead of the segment.

Data shredding is typically accomplished in a conventional storage system either by writing multiple times over the region storing the data, or by destroying the decryption information for data that was cryptographically encrypted before being stored. Because decryption information is typically much smaller than the original data, shredding by destroying decryption information can be much faster than by overwriting the original data. However, since a segment can be shared by multiple files in a segment deduplication storage system, shredding cannot be achieved by deleting decryption information used to encrypt the segments that make up a file.

BRIEF DESCRIPTION OF THE DRAWINGS

Various embodiments of the invention are disclosed in the following detailed description and the accompanying drawings.

DETAILED DESCRIPTION

Figure 1A:
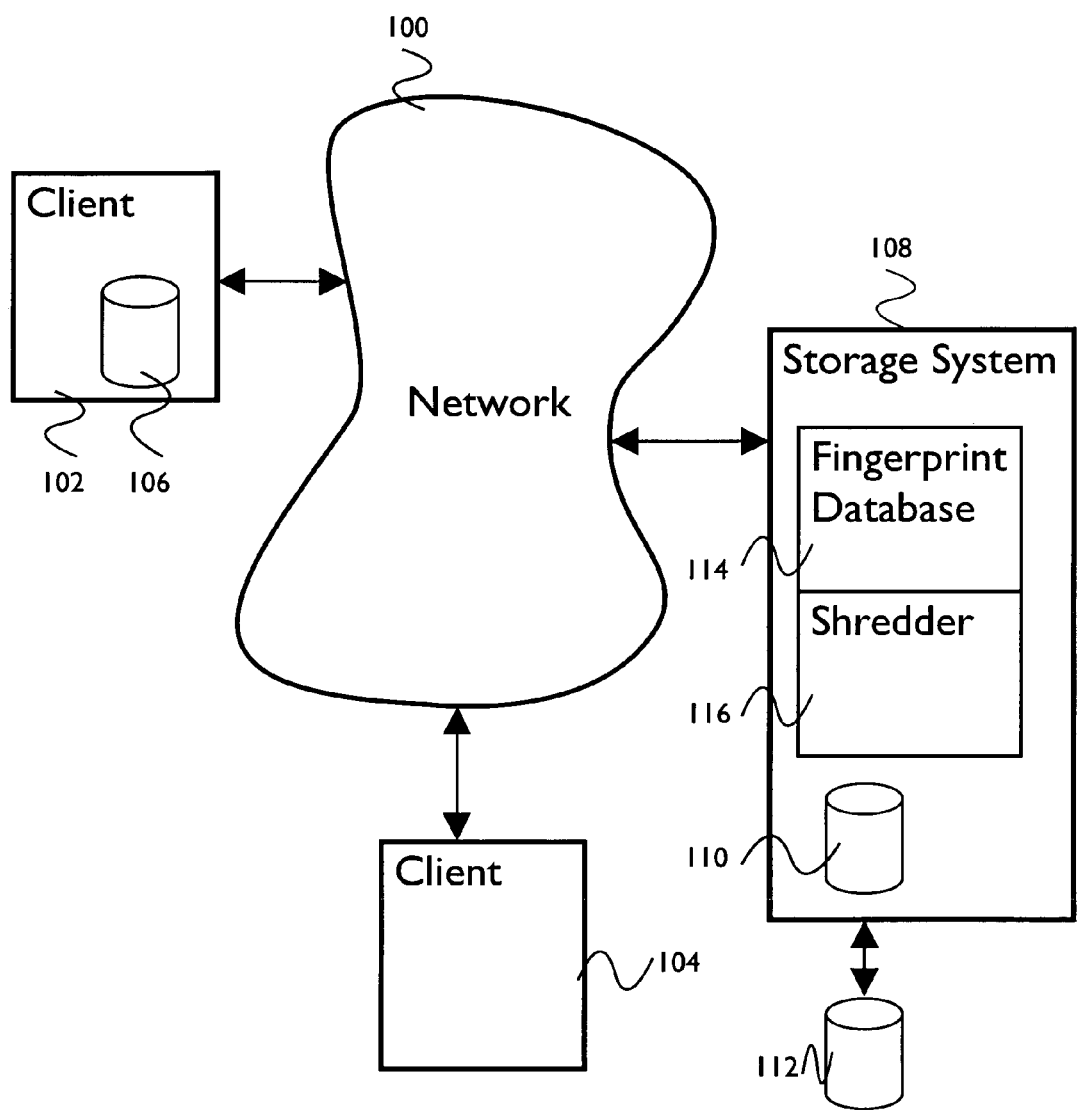
FIG. 1A is a block diagram illustrating an embodiment of a system for data shredding and storage using segment deduplication.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data shredding in a segment deduplication storage system is disclosed. Shredding a file comprises making a file impractical to be retrieved. Efficient data shredding is accomplished by encryption of the segmented file database and destruction of appropriate decryption information for the file in the segmented file database that is to be shredded. Data encryption in a deduplicated system is accomplished by assigning each data segment a decryption key based upon its content. For example, the decryption key can be computed by a keyed hash function of the data segment, such as a keyed-hash message authentication code (HMAC) hash function. Decryption keys for each encrypted data segment are stored in a database that is also encrypted. In various embodiments, the database is implemented as a data file, a hash table, a tree structure, or another appropriate kind of data structure. In various embodiments, the master decryption key for the decryption key database is generated from the content stored in the system, is not generated from the content stored in the system, is entered by a user, is randomly generated, or is created in some other appropriate way. In some embodiments, file shredding is accomplished by removing all decryption keys from the decryption key database necessary to access all data segments that are a part of the file to be shredded and re-encrypting the decryption key database with a new master encryption key.

In some embodiments, the decryption key database is stored using a directory manager file. In some embodiments, the directory manager file is decrypted and a file reference in a directory manger file is removed before re-encrypting the directory manager file. The removal of the file reference, which includes the removal of a file encryption key, makes it impractical to retrieve the file.

FIG. 1A is a block diagram illustrating an embodiment of a system for data shredding and storage using segment deduplication. In the example shown, network 100 connects one or more clients, represented in FIG. 1A by clients 102 and 104 with a storage system 108. A client may have a local storage device in addition to local memory. For example, client 102 has storage device 106, whereas client 104 does not have a local storage device. Storage system 108 stores data either using internal storage device 110 or attached external storage device 112. In some embodiments, segment deduplication is assisted by fingerprint database 114, which comprises fingerprint data associated with each file stored in storage system 108, along with the corresponding location in memory of the file. Storage system 108 includes shredder 116.

Network 100 comprises one or more of the following: a local area network, a wide area network, a wired network, a wireless network, the Internet, a fiber network, a storage area network, or any other appropriate network enabling communication. Clients 102 and 104 may be in physical proximity or may be physically remote from one another. Storage system 108 may be located in proximity to one, both, or neither of clients 102 and 104.

In various embodiments, storage devices 106, 110 and 112 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 1B:
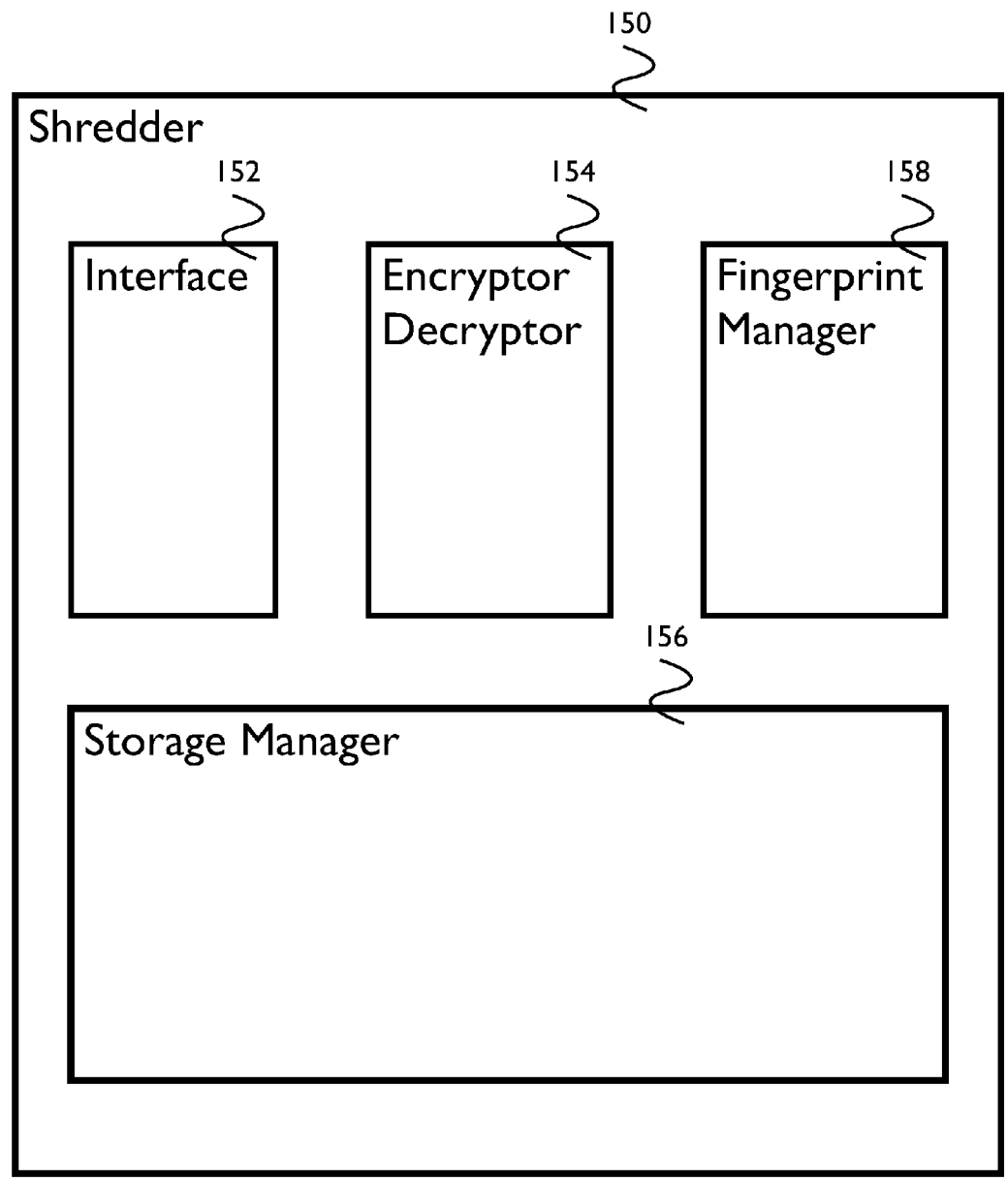
FIG. 1B is a block diagram illustrating an embodiment of components of a system for shredding.

FIG. 1B is a block diagram illustrating an embodiment of components of a system for shredding. In some embodiments, shredder of FIG. 1B is used to implement shredder 116 of FIG. 1A. In the example shown, shredder 150 includes interface 152, encryptor/decryptor 154, storage manager 156, and fingerprint manager 158. Interface 152 receives a directory manager file and directory manager file keys. Encryptor/decryptor 154 encrypts and decrypts a directory manager file using the directory manager file keys. Encryptor/decryptor 154 computes file encryption keys. Storage manager 156 accesses, manipulates (e.g., deleting a file reference), and stores the directory manager file in a data structure (e.g., a hierarchical data structure) as well as data segments in a data structure. Fingerprint manager 158 calculates fingerprints and accesses, manipulates, and stores fingerprints in a fingerprint database.

Figure 2A:
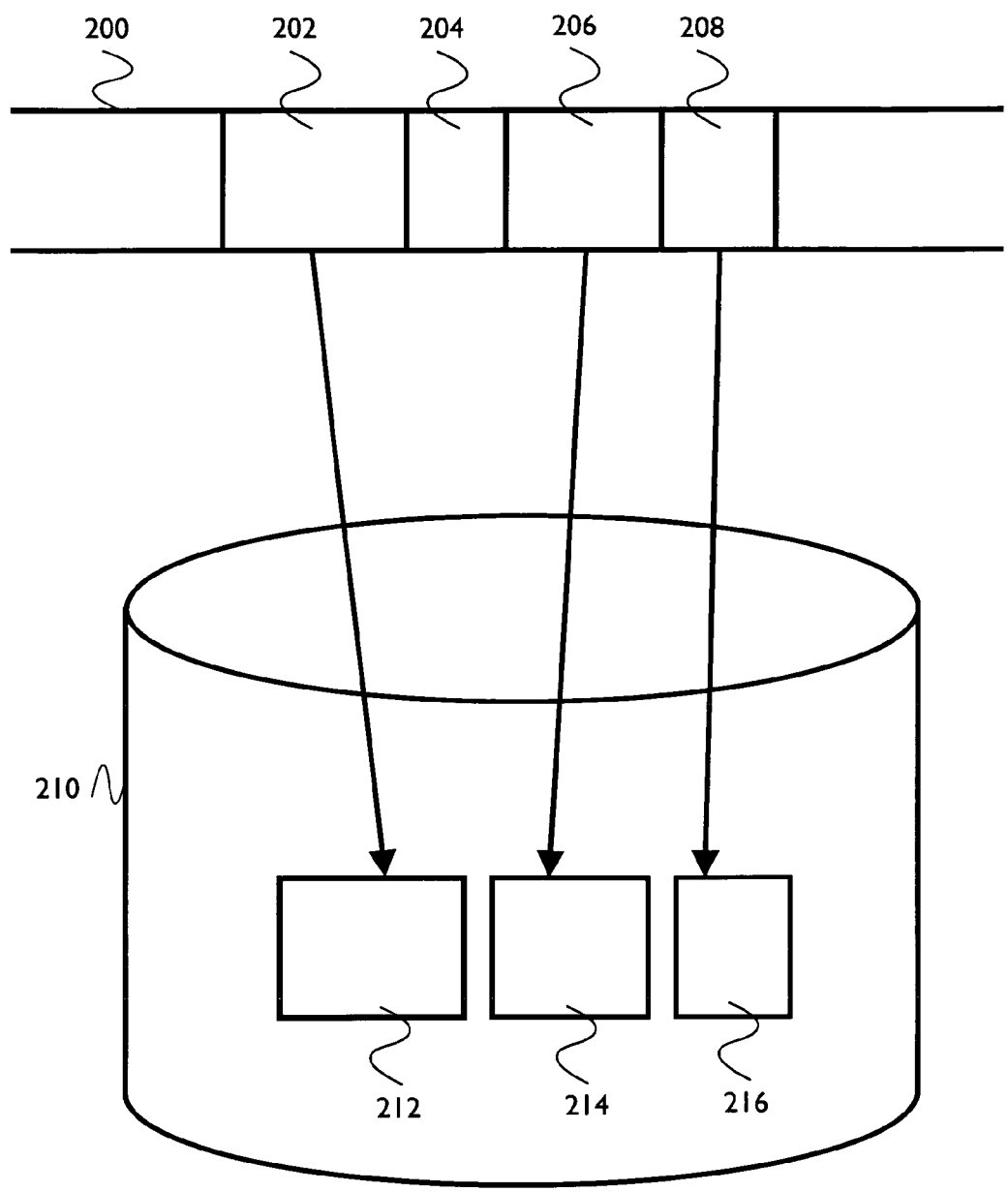
FIG. 2A is a block diagram illustrating an embodiment of a segment deduplication data storage system.

FIG. 2A is a block diagram illustrating an embodiment of a segment deduplication data storage system. In the example shown, portion of data stream or data block 200 is received by a data storage system (e.g., storage system 108 of FIG. 1A). Portion of data stream or data block 200 is sent from one or more clients (e.g., client 102 or client 104 of FIG. 1A). Portion of data stream or data block 200 is to be stored in storage device 210, representing a storage device of a storage system (e.g., storage device 110 or storage device 112 of FIG. 1A).

In the example shown, portion of data stream or data block 200 is segmented into segments 202, 204, 206 and 208. Data stream or data block 200 is segmented by creating a plurality of segments from data stream or data block 200 that can be used to reconstruct data stream or data block 200. Segments, when used to reconstruct data stream or data block 200, can be overlapping, non-overlapping, or a combination of overlapping and non-overlapping. Segment boundaries can be determined using file boundaries, directory boundaries, byte counts, content-based boundaries (e.g., when a hash of data in a window is equal to a value), or any other appropriate method of determining a boundary. Reconstruction of a data block, data stream, file, or directory includes using references to the one or more segments that originally made up the data block, data stream, file, or directory.

Storage device 210 is checked for existence of data segments to be stored (e.g., to see if a data segment is currently already stored), such as data segments 202, 204, 206, and 208. In the example shown, data segments are stored if found to not exist within the storage device. Existence checking may be performed by searching storage device 210 for the entire data segment to be stored, or by generating smaller fingerprint data and searching a table of fingerprints (e.g., a fingerprint database such as fingerprint database 114 of FIG. 1A) corresponding to segments currently stored for the fingerprint of the data segment to be stored. Fingerprint data for a given data segment may or may not be derived from the content of the data of the segment, and may be generated deterministically or randomly. In the example shown, data segments such as segments 202, 206, and 208 are found not to exist in storage device 210 and are stored in storage device 210—for example, as stored data segments 212, 214, and 216. Segment 204 is found to exist within storage device 210, so a reference to 204 is stored in order to be able to reconstruct data stream or data block 200. Note that the fingerprints are unencrypted. This allows the system to deduplicate additional new data or new data segments without requiring already stored data to be decrypted, yet still maintaining secure shredding.

Figure 2B:
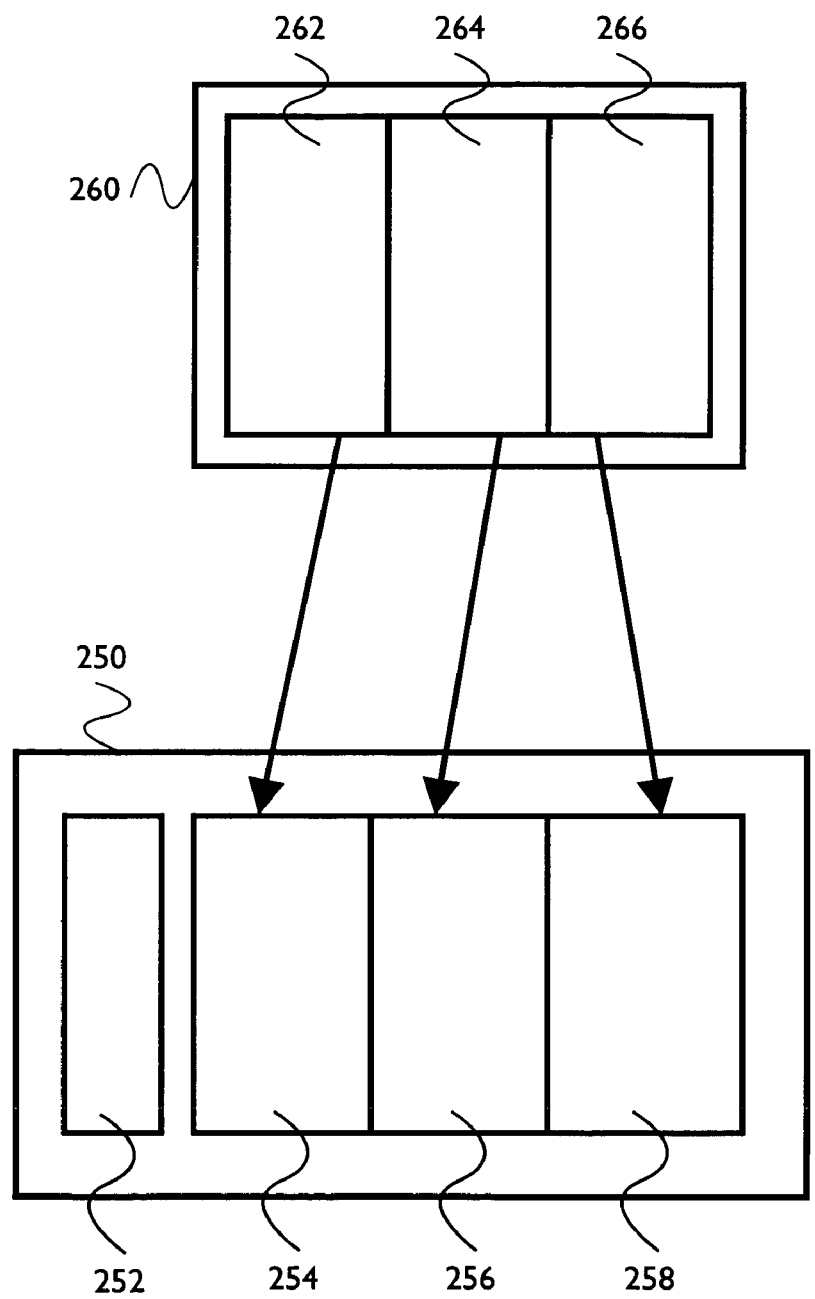
FIG. 2B is a block diagram illustrating an embodiment of an encryption key data segment and a container.

FIG. 2B is a block diagram illustrating an embodiment of an encryption key data segment and a container. In some embodiments, the container is used to encapsulate stored data segments along with associated metadata that are used to facilitate data retrieval. In some embodiments, the container of FIG. 2B is stored in a storage device of a storage system (e.g., storage device 110 or storage device 112 of storage system 108 of FIG. 1A or storage device 210 of FIG. 2A). In the example shown, stored data segments 254, 256, and 258 are encrypted in order to allow fast data shredding. Stored data segments 254, 256, and 258 are encrypted using file encryption keys 262, 264, and 266, and stored in container 250. In some embodiments, file encryption keys 262, 264, and 266 comprise a hash of at least a portion of the content of stored data segments 254, 256, and 258. In various embodiments, the hash function is an insecure hash function (e.g., a SHA-1 function), a cryptographically secure keyed hash function (e.g., an HMAC function), or any other appropriate hash function. Container 250 may contain one or more encrypted data segments. Encryption keys 262, 264, and 266 are joined into a single data segment 260, which is stored in a storage device (e.g., storage device 210).

In the example shown in FIG. 2B, metadata 252 is also stored in container 250. Metadata 252 includes fingerprint data for encrypted data segments 254, 256, and 258. Fingerprint data is computed using a one-way function of the encryption key of a segment. The one-way function is designed such that computation of the fingerprint data from the encryption key of a segment is computationally easy, but computation of the encryption key from the fingerprint data is computationally very difficult. In various embodiments, the one-way function comprises an exponential modulo p function, the Rivest-Shamir-Aldeman (RSA) function, the Rabin function, any one-way function that has been constructed from a block cipher (such as data encryption standard (DES), advanced encryption standard (AES), etc.), or any other appropriate one-way function.

Figure 3A:
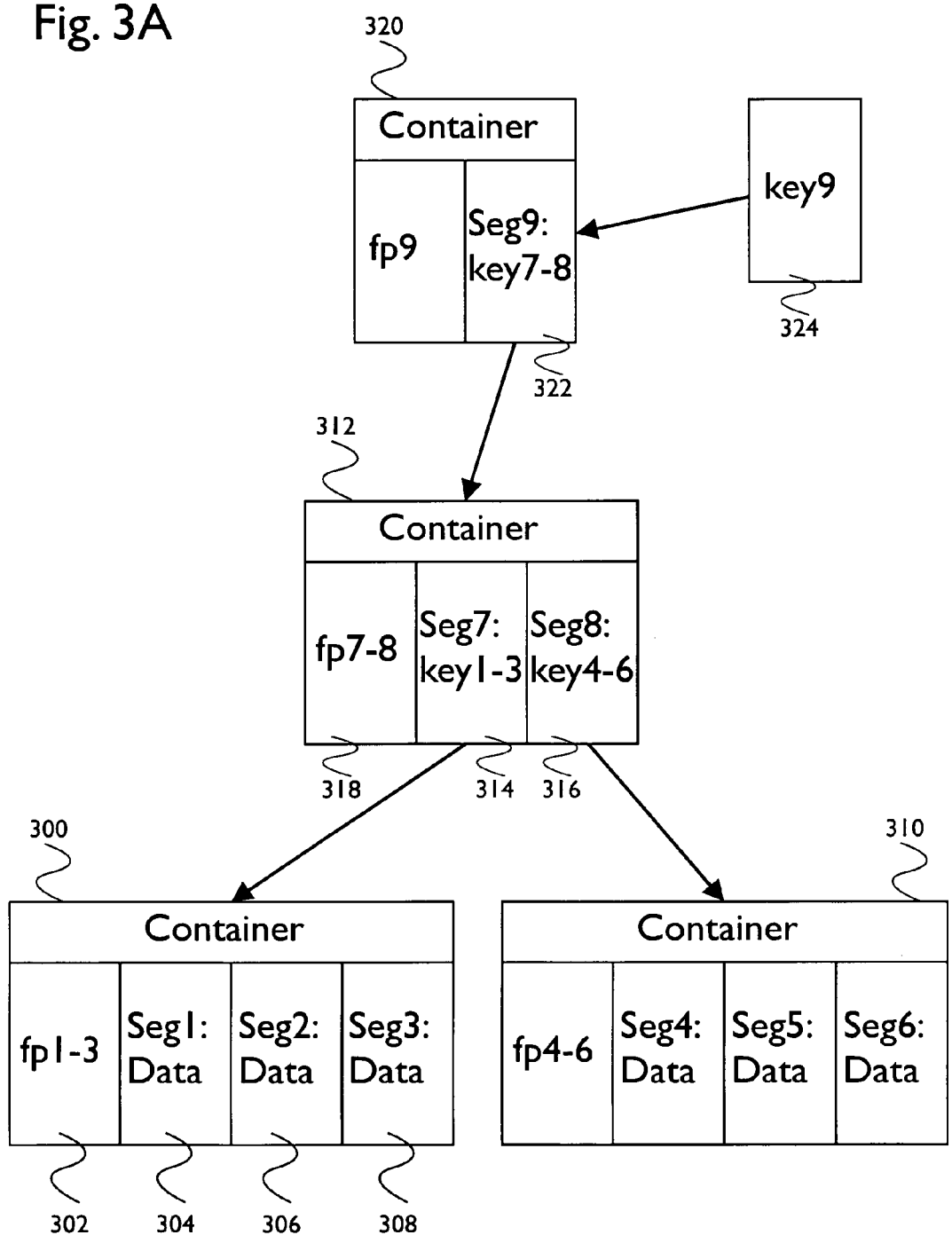
FIG. 3A is a block diagram illustrating an embodiment of a hierarchical data structure.

FIG. 3A is a block diagram illustrating an embodiment of a hierarchical data structure. In some embodiments, data stored in a storage device such as storage device 210 of FIG. 2A as part of a container such as container 250 of FIG. 2B is arranged in a hierarchical data structure as shown in FIG. 3A. FIG. 3A illustrates a possible storage configuration for an example data file. In the example shown, a data file is stored where the data file has been broken into six unique data segments: Seg1, Seg2, Seg3, Seg4, Seg5, and Seg6. A maximum of three data segments are stored in a data container. The lowest layer of the hierarchical data structure contains the file data stored in container 300 and container 310. Container 300 comprises data segments 304, 306, and 308, along with metadata 302. Metadata 302 includes fingerprint data. Data segments 304, 306, and 308 are stored after being encrypted with encryption keys 314. In some embodiments, encryption keys 314 comprise encryption keys 262, 264, and 266 of FIG. 2B, and metadata 302 comprise metadata 252 of FIG. 2B. Container 310 has a similar structure that stores three data segments and the corresponding fingerprint metadata.

Figure 4A:
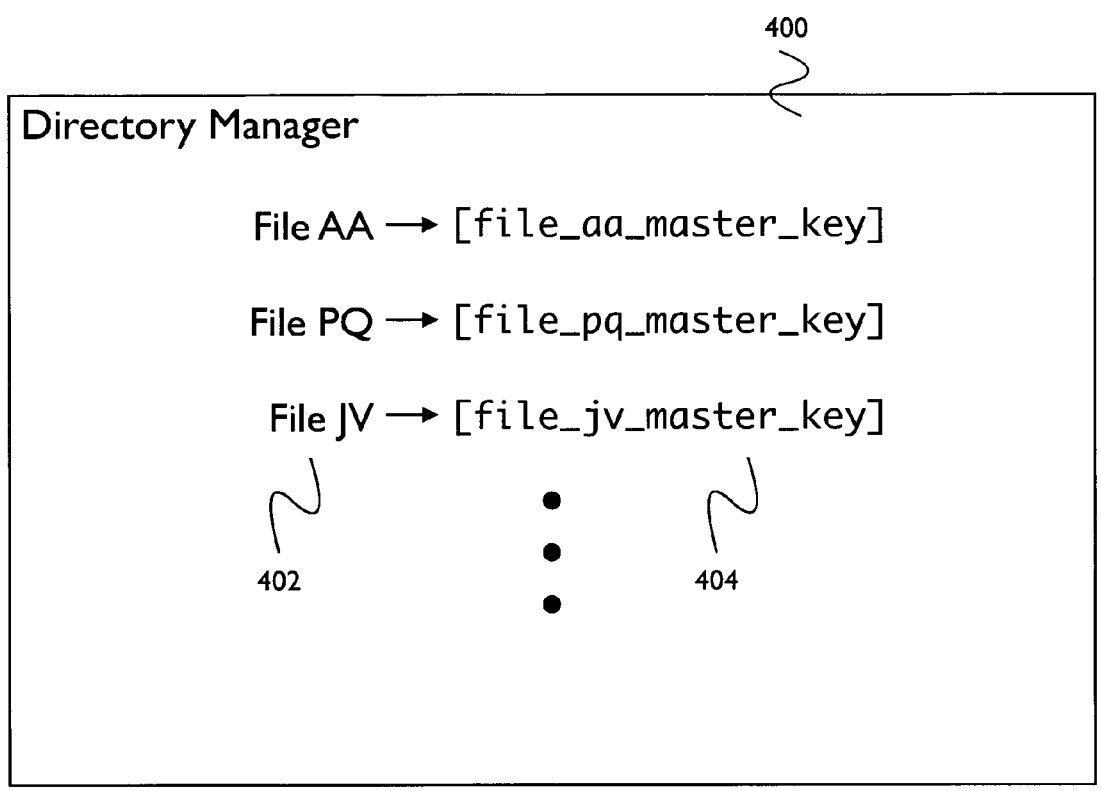
FIG. 4A is a diagram illustrating an embodiment of a directory manager file.

Container 312 comprises encryption key data segments 314 and 316, with a similar structure to containers 300 and 310. Data segments 314 and 316 are encrypted before being stored using encryption keys 322. Encryption key data segment 322 and data fingerprints 318 are computed as described in the paragraph regarding FIG. 2B. Having a "lower" tier data segment be encrypted using a key in a segment that is in a "higher" tier creates a hierarchical data structure. At the top of the data structure is a single encryption key data segment 322, referred to as the "supersegment" for the data file. The single encryption key 324 computed to encrypt the supersegment is the master encryption key for the file, and is stored in a directory manager file, an embodiment of which is shown in FIG. 4A. In various embodiments of the hierarchical data structure, there are an arbitrarily large or small number of tiers of encryption key data segments, depending on the total number of data segments the stored file has been broken into and on the number of data segments or encryption key data segments stored in each data container. In various embodiments, the directory manager file is stored in a hierarchical data structure or in another kind of data structure.

In various embodiments, the number of segments stored in a data container is any number, is constrained by a maximum number (e.g., any value such as 10, 55, 206, etc.), is constrained by a minimum number (e.g., any value such as 8, 15, 100, etc.), is variable over time, or any other appropriate number of segments stored in a data container.

Figure 3B:
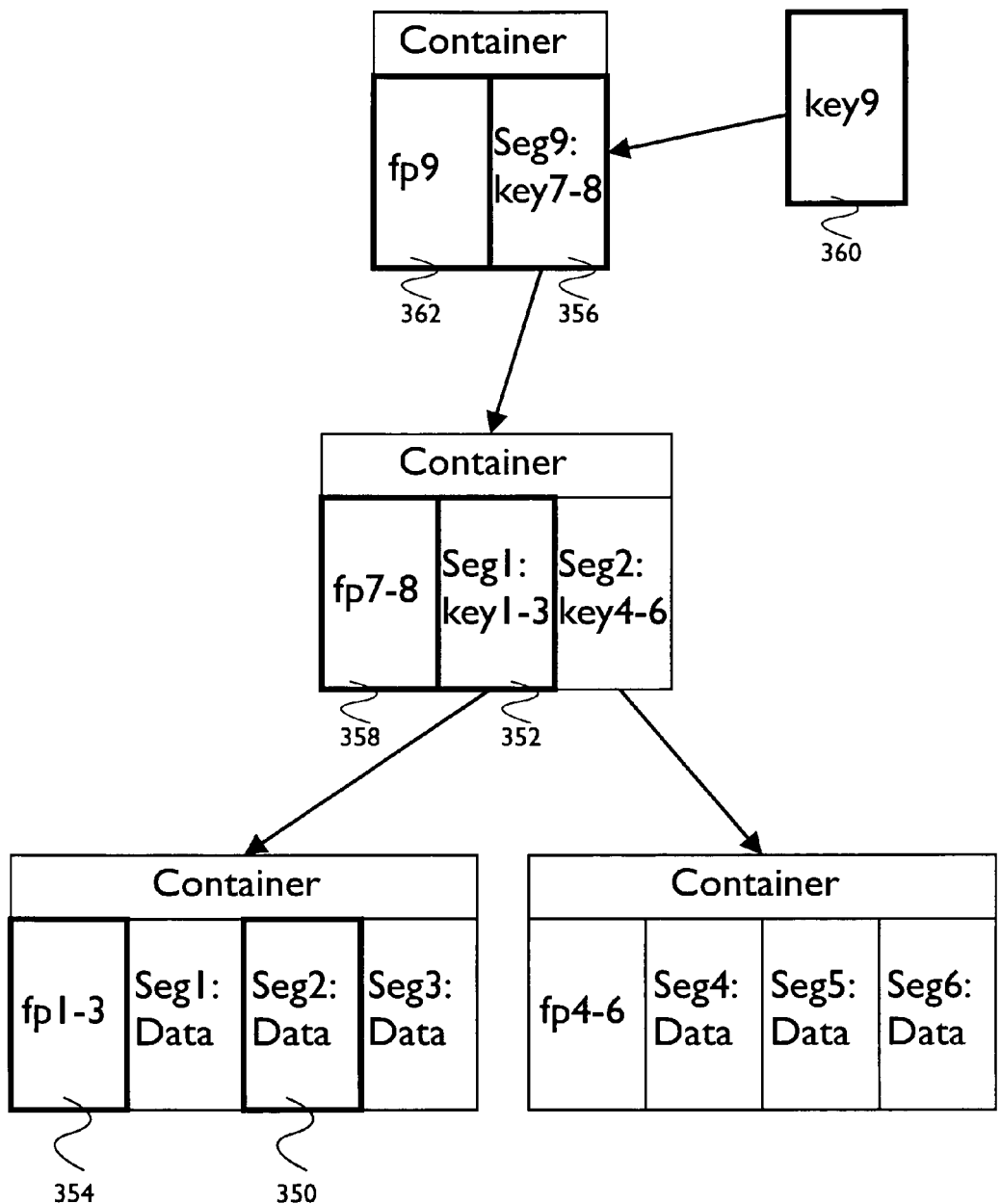
FIG. 3B is a block diagram illustrating an embodiment of a data structure for a file undergoing a data modification process.

FIG. 3B is a block diagram illustrating an embodiment of a data structure for a file undergoing a data modification process. In some embodiments, the file stored in FIG. 3B comprises the file stored in a hierarchical data structure as described in FIG. 3A. In the example, shown, when a single change is made to the file, for example to data segment 350, each of the data blocks shown with heavy outline in FIG. 3B is modified. Modification of segment 350 requires recomputation of encryption keys 352 and fingerprints 354, as both are computed from the content of the file to be stored. Segment 350 is then reencrypted using the new key stored in segment 352. This process is then repeated up the tree structure, as modification of segment 352 requires recomputation of keys 356 and fingerprints 358, and reencryption of segment 352. When the supersegment 356 is reached, a new master key 360 and supersegment fingerprint 362 are computed, and the new master key 360 is recorded in the directory manager file.

FIG. 4A is a diagram illustrating an embodiment of a directory manager file. In some embodiments, files stored in a storage system (e.g., storage system 210 of FIG. 2A) are stored and encrypted in a hierarchical data structure (e.g., such as is shown in FIG. 3A). Each file stored and encrypted in this way has a master encryption key (e.g., master key 324 of FIG. 3A). The segment deduplicating storage system generates a directory manager file comprising all the master keys that have been generated as part of the hierarchical structure. In the example shown, directory manager file 400 comprises a list of files 402 and corresponding master keys 404. In some embodiments, the directory manager file is stored as any other data file; it is first segmented using an algorithm, and then the segments are stored using a hierarchical data structure.

In some embodiments, the directory manager file is stored in a non-hierarchical data structure or in another appropriate kind of data structure.

Figure 4B:
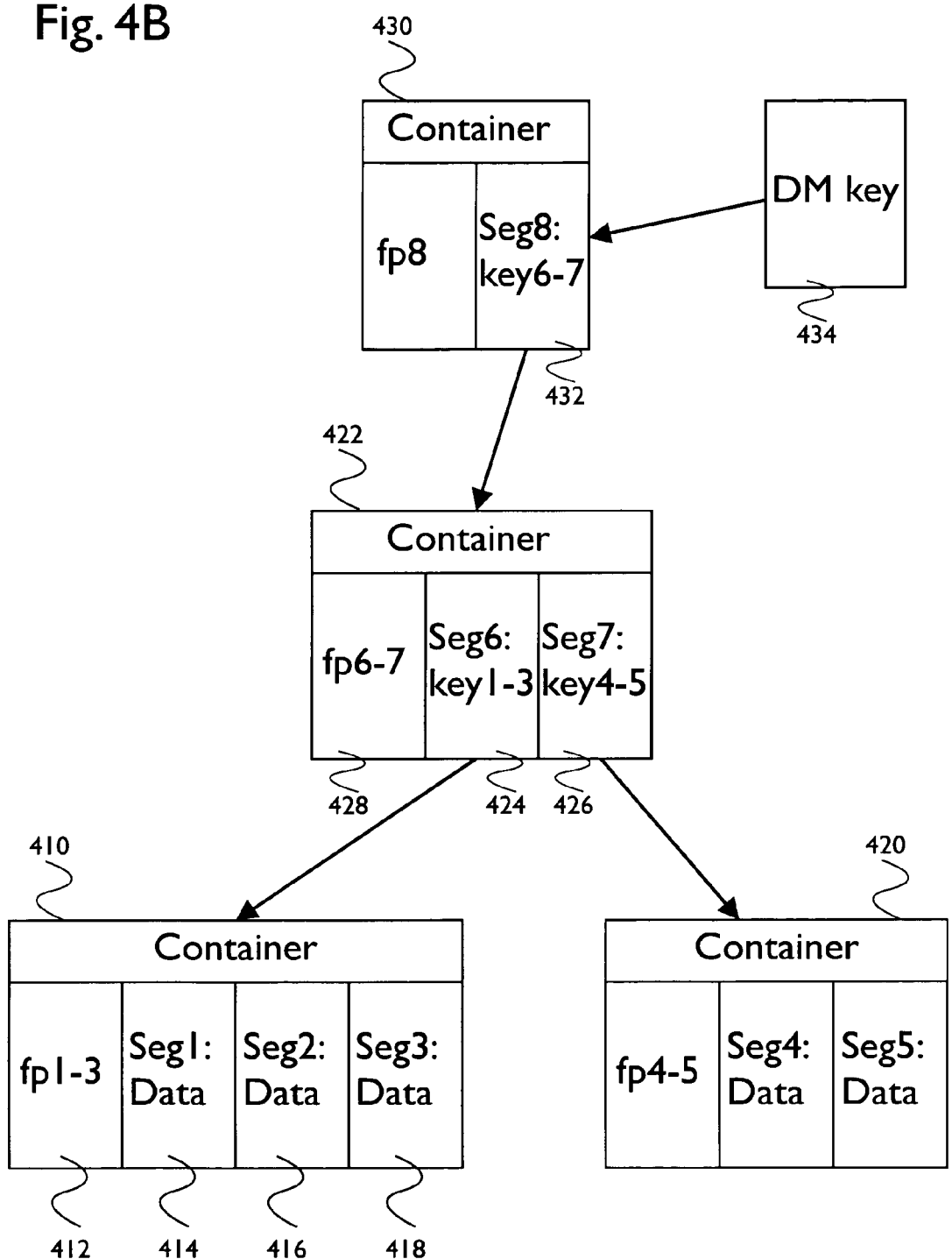
FIG. 4B is a block diagram illustrating an embodiment of a data structure for storing a directory manager file.

FIG. 4B is a block diagram illustrating an embodiment of a data structure for storing a directory manager file. In some embodiments, the data structure of FIG. 4B is used to store a directory manager file (e.g., directory manager 400 of FIG. 4A). In the example shown, the directory manager file is broken into five unique data segments: Seg1, Seg2, Seg3, Seg4, and Seg5. Container 410 comprises data segments 414, 416, and 418, along with fingerprint metadata 412. Data segments 414, 416, and 418 are stored after being encrypted using encryption keys 424. In some embodiments, encryption keys 424 comprise encryption keys 262, 264, and 266 of FIG. 2B, and data fingerprints 412 comprises metadata 252 of FIG. 2B. Container 420 has a similar structure that stores two data segments and the corresponding fingerprint metadata. Container 422 comprises encryption key data segments 424 and 426, with a similar structure to containers 410 and 420. Data segments 424 and 426 are encrypted before being stored using encryption keys 432. Encryption key data segment 432 and data fingerprints 428 are computed as described in the paragraph regarding FIG. 2B. Having a "lower" tier data segment be encrypted using a key in a segment that is in a "higher" tier creates, a hierarchical data structure. At the top of the data structure is a single encryption key data segment 432, referred to as the "prime segment" for the database, analogous to the supersegment for data files stored in the system. The encryption key 434 used to encrypt the prime segment (referred to hereafter as the "DM key") is chosen by an administrator and is required to perform any file operation on the database. In various embodiments of the hierarchical data structure, there is an arbitrarily large or small number of tiers of encryption key data segments, depending on the total number of data segments the directory manager file has been broken into and on the number of data segments or encryption key data segments stored in each data container.

Figure 4C:
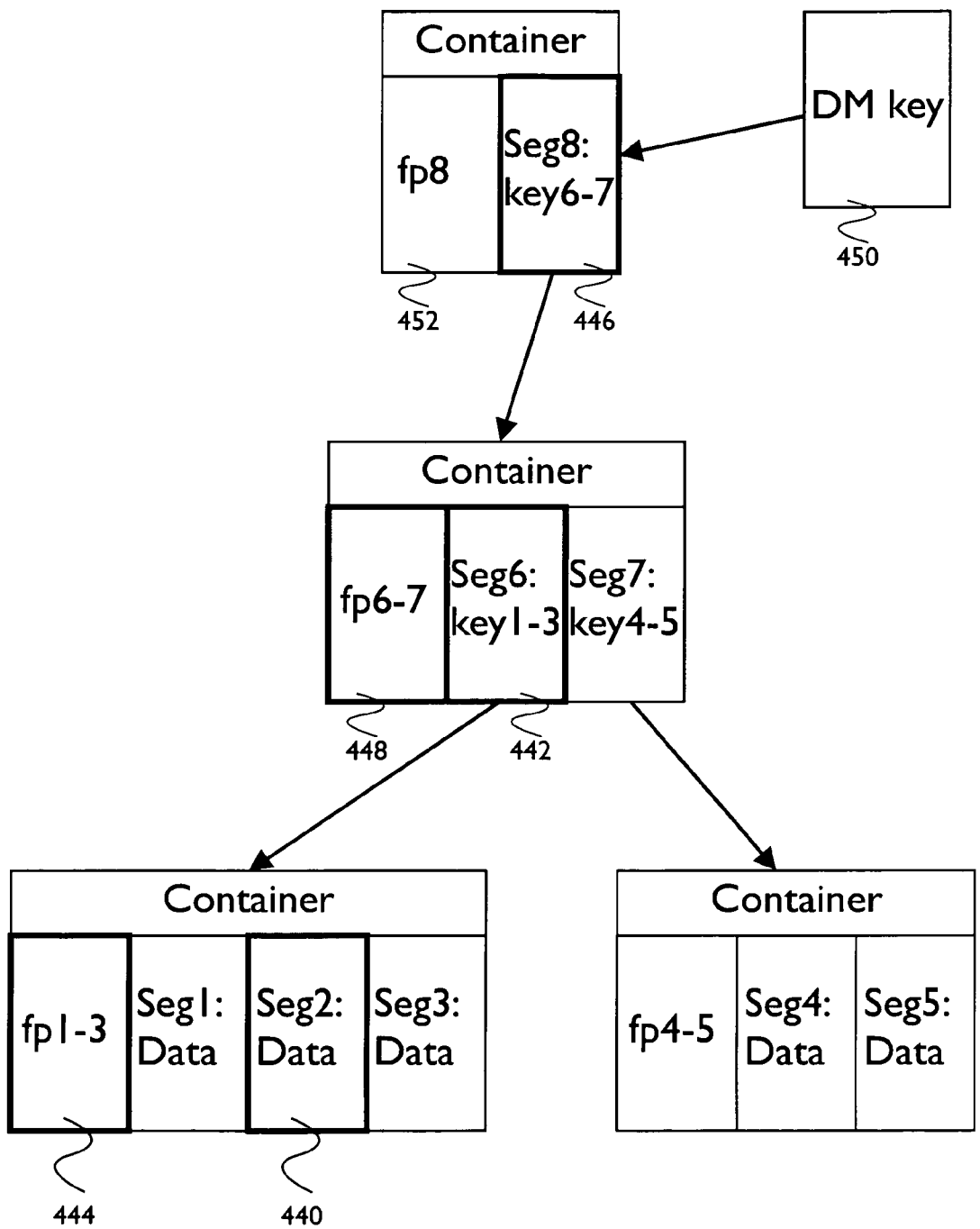
FIG. 4C is a block diagram illustrating an embodiment of a data structure for a directory manager file undergoing a data modification process.

FIG. 4C is a block diagram illustrating an embodiment of a data structure for a directory manager file undergoing a data modification process. In some embodiments, the directory manager in FIG. 4C comprises the directory manager file stored in a hierarchical data structure as described in FIG. 4B. In the example shown, when a file undergoes a data modification process as shown in FIG. 3B, ultimately the master key is modified in the directory manager file. When the master key modification is made to the directory manager file (e.g., a change to data segment 440), each of the data segments shown with a heavy outline in FIG. 4C are modified. Modification of segment 440 requires recomputation of encryption keys 442 and fingerprints 444, as both are computed from the content of the file to be stored. Segment 440 is then reencrypted using the new key stored in segment 442. This process is then repeated up the tree structure, as modification of segment 442 requires recomputation of keys 446 and fingerprints 448, and reencryption of segment 442. When the prime segment 446 is reached, it is encrypted using the previously set DM key 450, which is unchanged. In various embodiments, prime segment fingerprint 452 is computed from the DM key and is unchanged, or prime segment fingerprint 452 is computed from the hash of the contents of segment 452, is a randomly generated number, is any unique number in the system, or any other appropriate number that is used as a prime segment fingerprint.

Figure 4D:
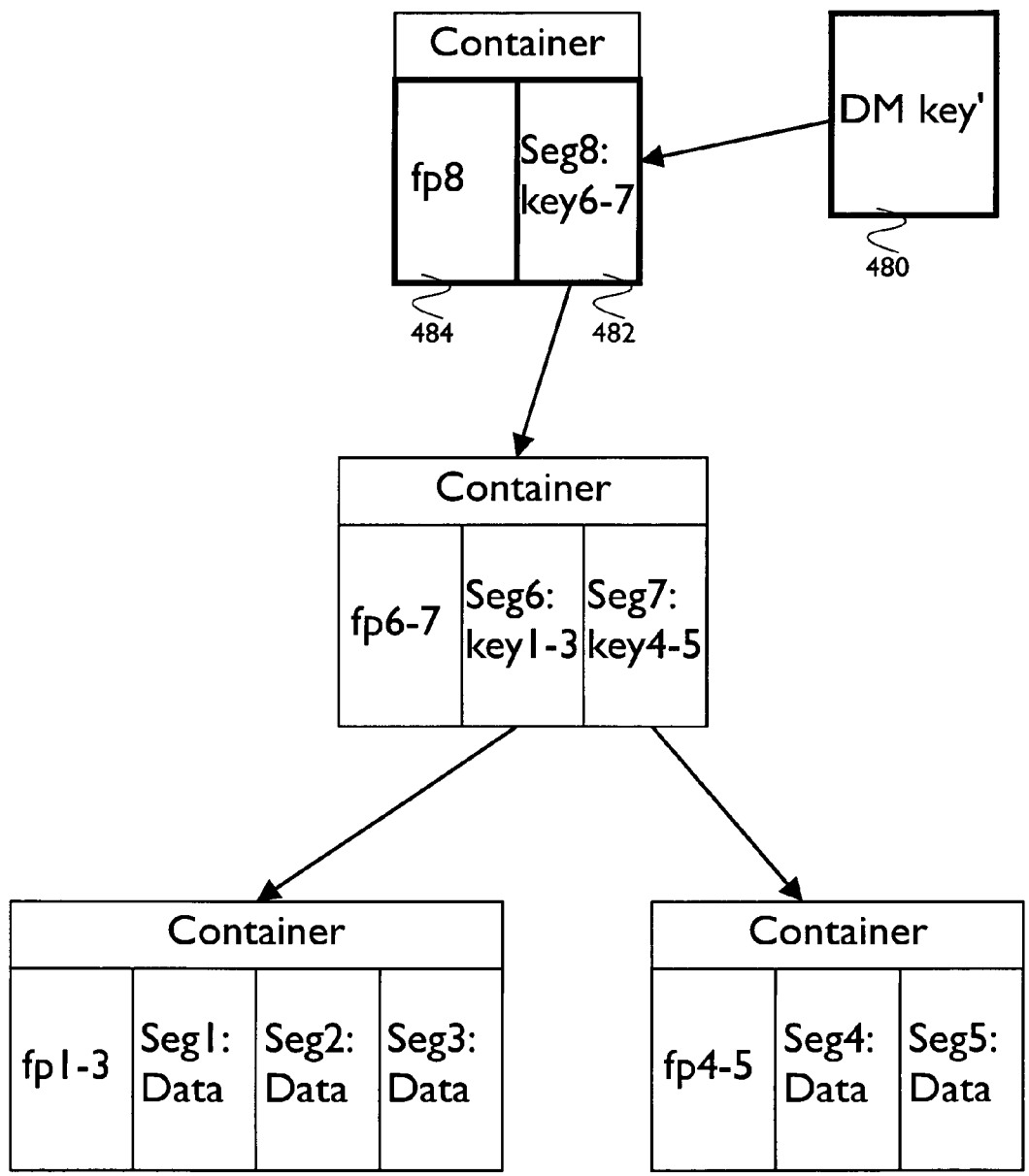
FIG. 4D is a block diagram illustrating an embodiment of a data structure for a directory manager file undergoing modification of the prime segment encryption key.

FIG. 4D is a block diagram illustrating an embodiment of a data structure for a directory manager file undergoing modification of the prime segment encryption key. In some embodiments, the prime segment encryption key is entered by a user, and is changed at an arbitrary time to an arbitrary value. In the example shown, when the DM key 480 is modified, the prime segment 482 is reencrypted using the new key, and a new fingerprint 484 is computed using a one-way function. In various embodiments, the one-way function comprises an exponential modulo p function, the RSA function, the Rabin function, any one-way function that has been constructed from a block cipher (such as DES, AES, etc.), or any other appropriate one-way function.

Figure 5A:
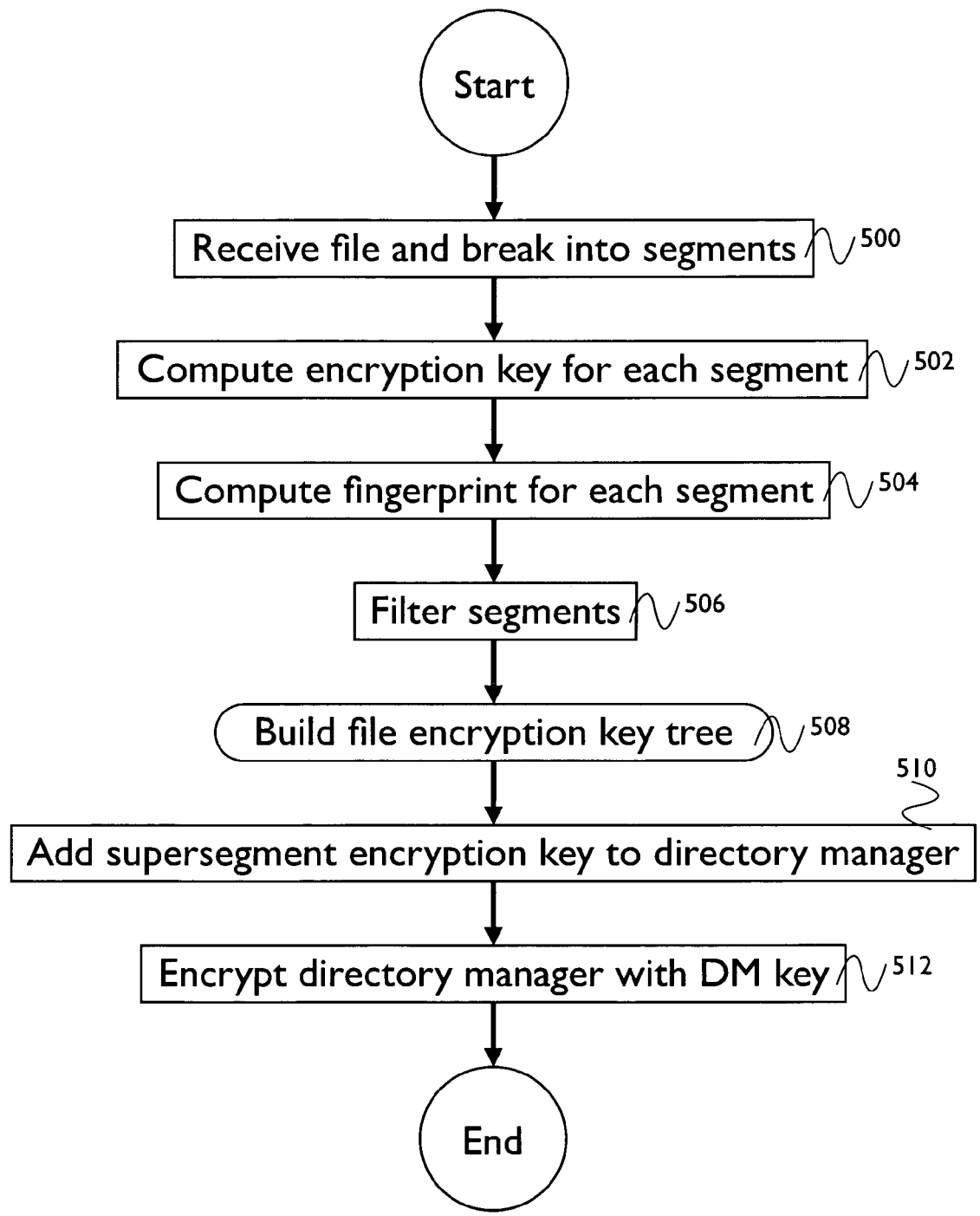
FIG. 5A is a flow diagram illustrating an embodiment of a process for storing a file.

FIG. 5A is a flow diagram illustrating an embodiment of a process for storing a file. In some embodiments, the process of FIG. 5A is used to add a file to a storage system such as storage system 108 of FIG. 1A or storage system 210 of FIG. 2A. In the example shown, in 500, a file to be stored in the system is received and broken into segments. Segment boundaries can be determined using file boundaries, directory boundaries, byte counts, content-based boundaries (e.g., when a hash of data in a window is equal to a value), or any other appropriate method of determining a boundary. In 502, an encryption key is computed for each segment. The encryption key is computed using an HMAC keyed hash function of the data content of the segment. In 504, a segment fingerprint is computed for each segment. The segment fingerprint is computed using a one-way function operating on the encryption key. In 506, the segments are filtered using the segment fingerprints. Fingerprints are looked up in the system fingerprint database (e.g. fingerprint database 114 of FIG. 1A), and if the fingerprint is found, the segment is removed from the collection of segments that need to be stored. In 508, a hierarchical data structure is built from the segments that need to be stored. The hierarchical data structure includes encrypted data segments. The hierarchical data structure further includes fingerprints and keys, which are used to encrypt the data segments. The keys are also encrypted before being stored using other keys that are also encrypted before being stored. At the top tier, the key used to encrypt the stored segment containing encrypted keys, comprises a supersegment encryption key. In 510, the supersegment encryption key is added to the directory manager file. In 512, the directory manager is reencrypted using a DM key, and the process ends.

Figure 5B:
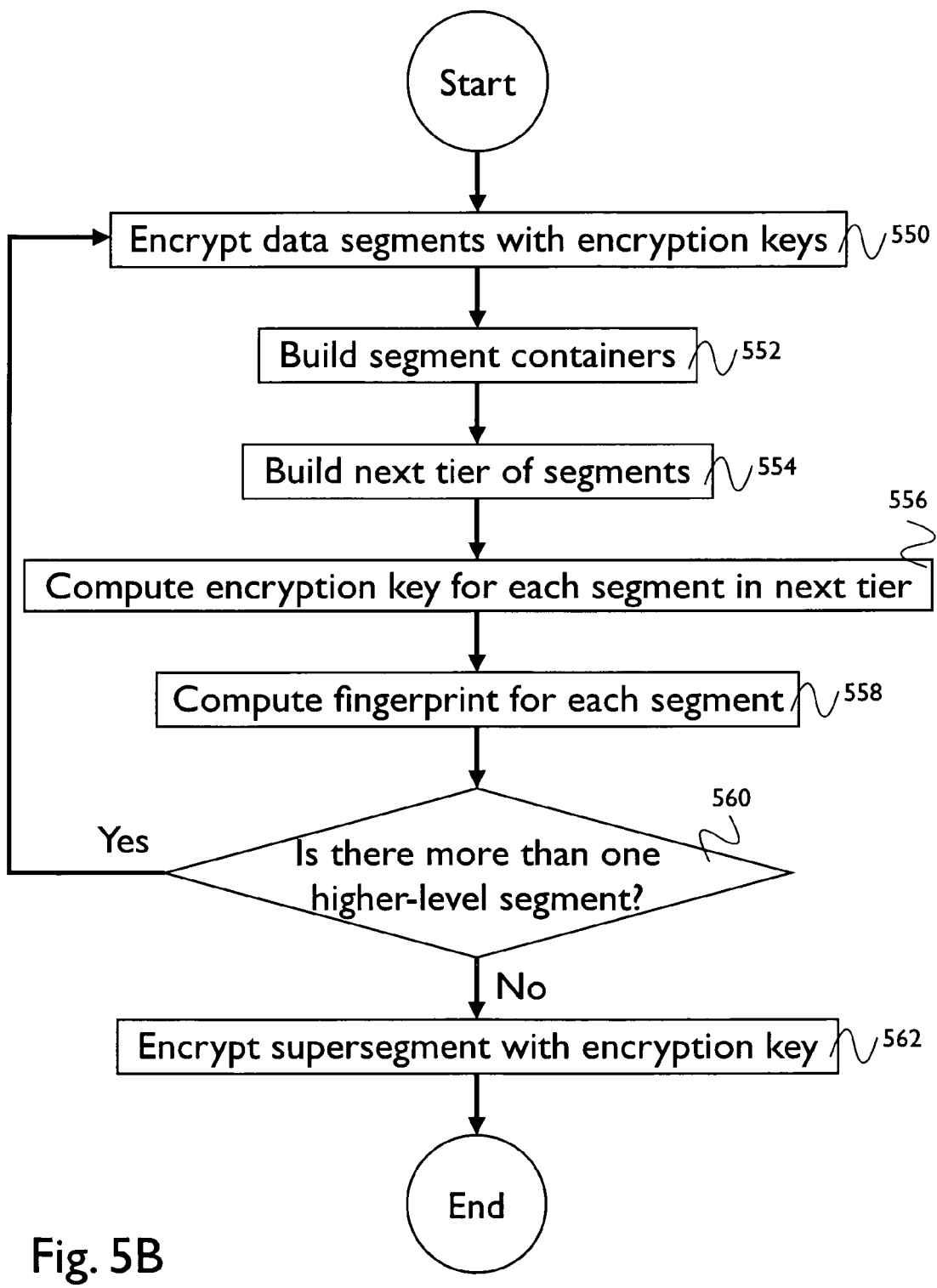
FIG. 5B is a flow diagram illustrating an embodiment of a process for building a file encryption key tree.

FIG. 5B is a flow diagram illustrating an embodiment of a process for building a file encryption key tree. In some embodiments, the process of FIG. 5B is used to implement 508 of FIG. 5A. In some embodiments, the process of FIG. 5B is used to build the hierarchical data structure shown in FIG. 3A. In the example shown, in 550, the file segments to be added to the system are encrypted using the encryption keys. In some embodiments, the encryption keys comprise encryption keys calculated previously (e.g., keys calculated in 502 of FIG. 5A). In 552, a file container (e.g., the file container as shown in FIG. 2B) is built from several encrypted segments grouped together with their unencrypted segment fingerprints. In various embodiments, the maximum number of segments grouped together in a file container is 2 or more, and the minimum number of segments grouped together in a file container is 1. In 554, the next tier of segments is built. In the next tier, the encryption keys for each segment in a container are grouped together, to form a new data segment. The new tier includes a segment for each of the data containers in the tier below. In 556, an encryption key is computed for each of the segments in the next tier. The encryption keys are computed using an HMAC keyed function operating on the data of the segment. In 558, a fingerprint is computed for each segment in the next tier. The fingerprint is computed using a one-way function operating on the segment encryption key. In 560, it is determined if there is more than one segment in the next tier. This determination ascertains if the top level of the hierarchy has been reached. If there is more than one segment, then control passes to 550. The top level of the hierarchy has not been reached, and the process loops to build the next level. If there is only one higher-level segment, then control passes to 562. The segment comprises the supersegment for the file. In 562, the supersegment is encrypted using the supersegment encryption key, and the process ends.

Figure 6:
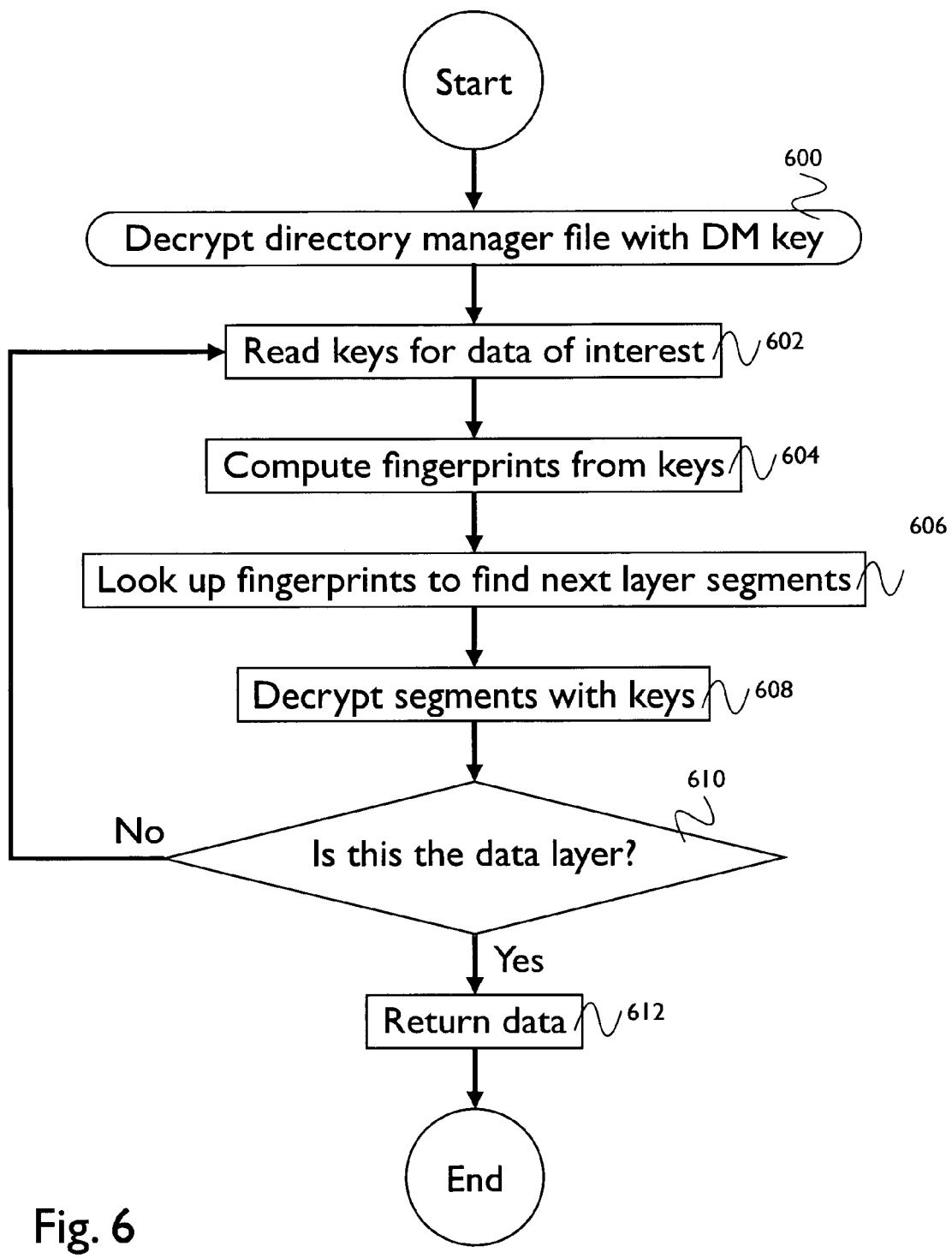
FIG. 6 is a flow diagram illustrating an embodiment of a process for reading a file.

FIG. 6 is a flow diagram illustrating an embodiment of a process for reading a file. In some embodiments, the process of FIG. 6 is used to read a file stored in a hierarchical data structure (e.g., a hierarchical data structure as shown in FIG. 3A). In the example shown, in 600 the directory manager file is decrypted. In 602, the data of interest is identified and the appropriate encryption keys are read. If the process is at the top tier of the hierarchy, the encryption keys read comprise the supersegment key for the file of interest. In 604, data fingerprints are computed from the encryption keys using the one-way function. In 606, the data fingerprints are used to locate desired data segments. In 608, the desired segments are then decrypted using the appropriate encryption keys. In 610, it is determined whether the desired data segments include the data of interest (i.e., that the bottom level of the hierarchy has been reached). If the desired data segment does not include the data of interest, then the data segment includes encryption keys for the next tier down, and control passes to 602. Another tier of the hierarchy is processed to achieve access to the data of interest. If the desired data segment includes the data of interest, then in 612 the data is returned, and the process ends.

Figure 7:
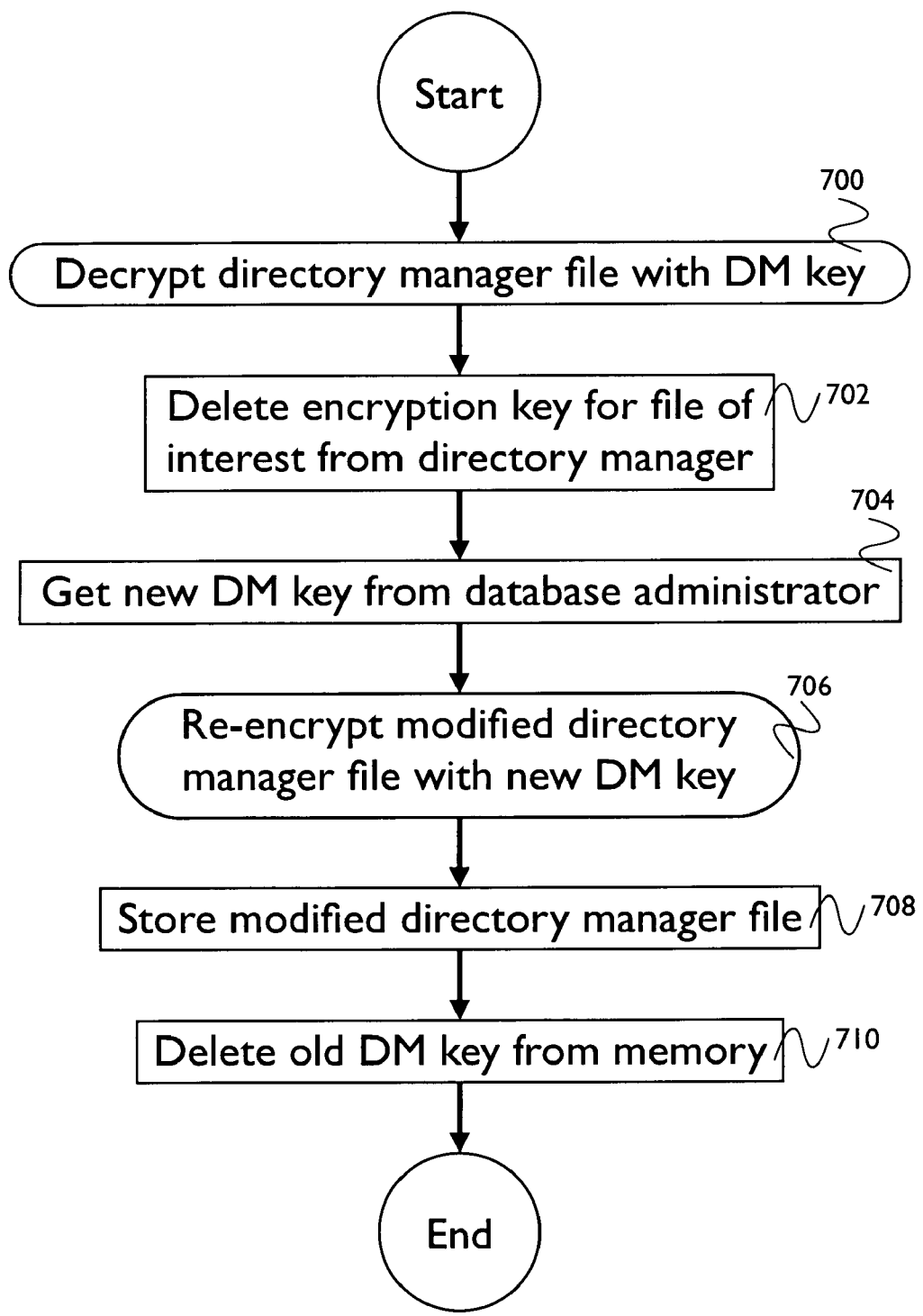
FIG. 7 is a flow diagram illustrating an embodiment of a process for shredding.

FIG. 7 is a flow diagram illustrating an embodiment of a process for shredding. In some embodiments, the process of FIG. 7 is used to shred a file stored in a hierarchical data structure (e.g., as shown in FIG. 3A). In the example shown, in 700, the directory manager file is decrypted using the DM key. In 702, the master encryption key for the file to be shredded is deleted from the directory manager file. In 704, a new DM key is received. In various embodiments, the DM key is received from a system administrator, a random number generator, a user, or any other appropriate source for a DM key. In 706, the modified directory manager file is re-encrypted with the new DM key. In 708, the modified directory manager file is stored. In 710, the old DM key is deleted from the memory, and the process ends.

In some embodiments, the DM key is stored only in random access memory. In various embodiments, the DM key is reentered into random access memory upon boot of the system manually, is read from a system boot flash where it is stored as a convenience feature for the system, is read from an external flash memory, or any other appropriate manner of entering a DM key. In the event that the DM key is stored on the boot flash, other flash, or any other memory, the DM key needs to be deleted after a new DM key is used following a shredding. In various embodiments, deleting the DM key comprises overwriting the flash using one or more patterns one or multiple times, overwriting as per military or other secure protocols, destroying the boot flash, other flash, or other memory, or any other appropriate manner of making the DM key inaccessible.

In some embodiments, the file and the fingerprint referring to the file are deleted.

Figure 8A:
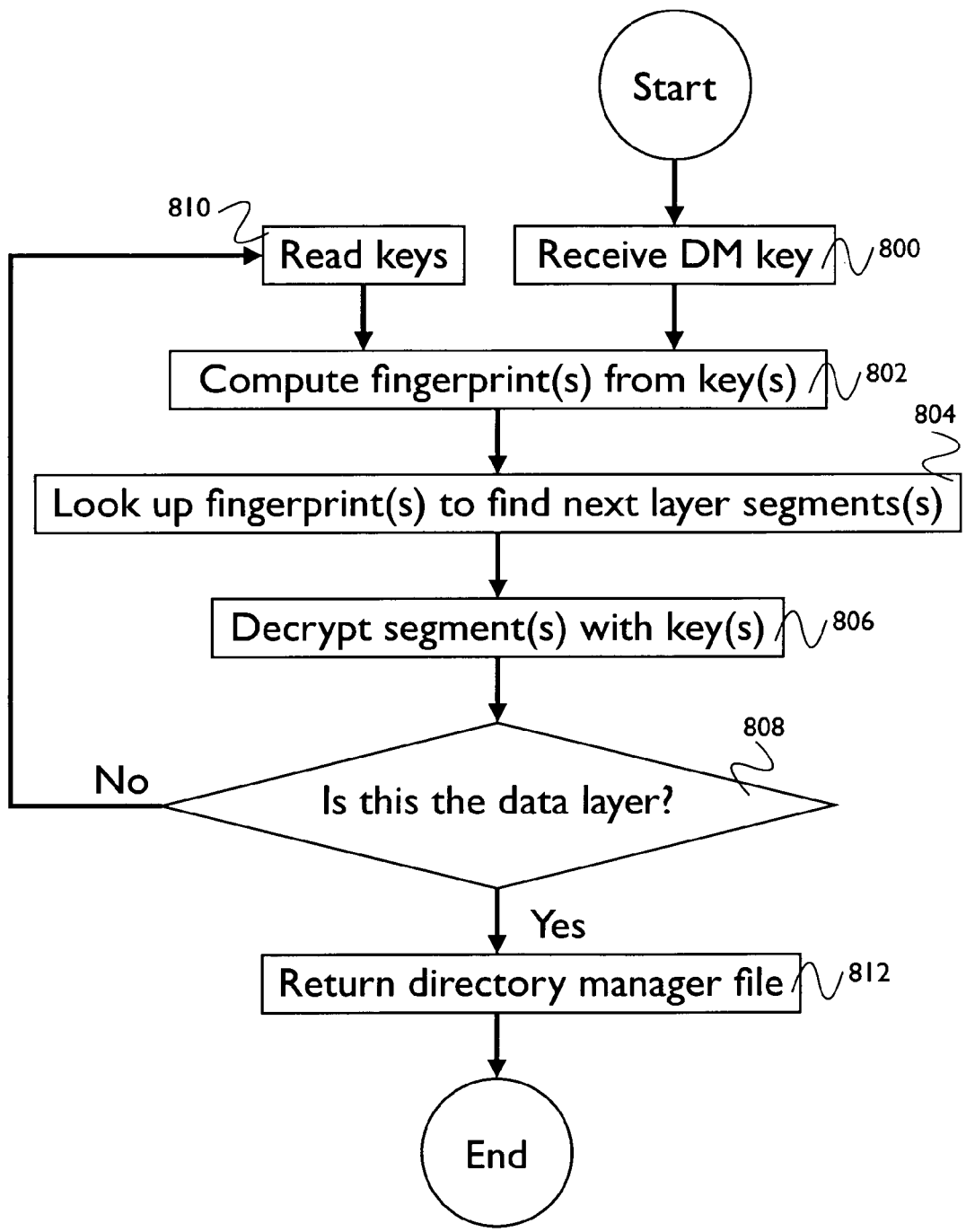
FIG. 8A is a flow diagram illustrating an embodiment of a process for decrypting a directory manager file.

FIG. 8A is a flow diagram illustrating an embodiment of a process for decrypting a directory manager file. In some embodiments, the process of FIG. 8A is used to implement 700 of FIGS. 7 and 600 of FIG. 6. In some embodiments, the decrypted directory manager file comprises a directory manager file of a segment deduplicating storage system stored in a hierarchical data structure such as is shown in FIG. 4B. In the example shown, in 800, the DM key is received. In various embodiments, the DM key is received from a system administrator at a prompt, from a system volatile memory, flash memory, high-capacity memory, or some other storage location, or from any other appropriate source for a DM key. The DM key is used as the first encryption key. In 802, the segment fingerprint is computed from the encryption key using the one-way function. In 804, the data segment is located using the fingerprint. In 806, the data segment is decrypted using the encryption key. In 808, it is determined if the decrypted segment includes the data manager file data of interest (i.e., the data at the lowest tier of the data manager file which includes a supersegment key for a file of interest). If the decrypted segment does not include the data manager file data of interest, then control passes to 810. In 810, the encryption keys for the next layer down in the hierarchical file system are read, and then control passes to 802. The next tier down is processed. If the decrypted segment does include the data manager file data of interest, then directory manager file data is returned, and the process ends.

Figure 8B:
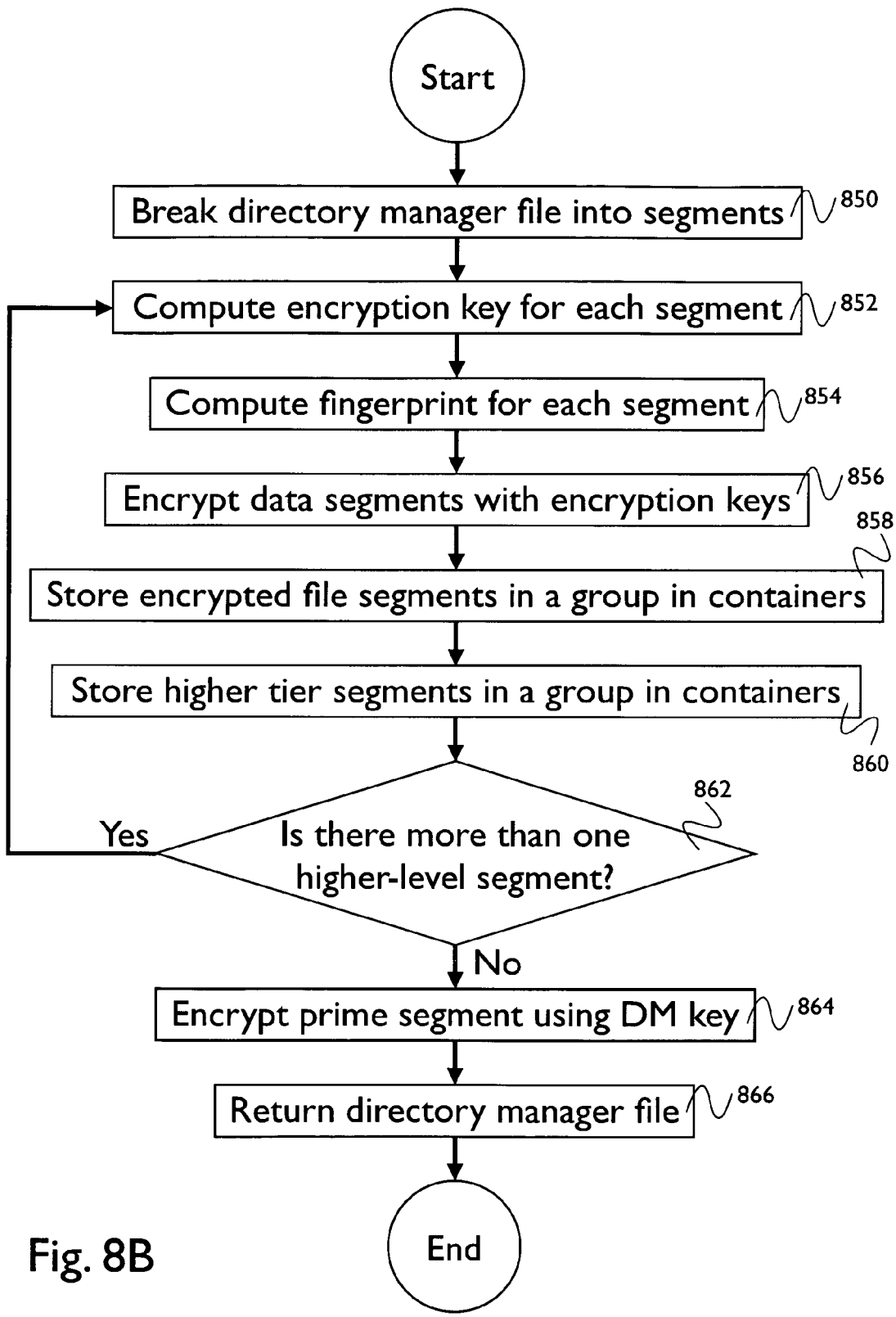
FIG. 8B is a flow diagram illustrating an embodiment of a process for storing a directory manager file.

FIG. 8B is a flow diagram illustrating an embodiment of a process for storing a directory manager file. In some embodiments, the process of FIG. 8B is used to implement 706 of FIG. 7. In the example shown, in 850, the directory manager file is broken into segments. In some embodiments, the directory manager file is segmented using a similar process as is used to segment data files in a segmented deduplication storage system (e.g., as described for 500 of FIG. 5A). In 852 encryption keys for the file segments are computed. The encryption keys are computed using a hash function. In 854, fingerprints for the file segments are computed. The fingerprints are computed using a one-way function. In 856, the file segments are encrypted using the computed encryption keys. In 858, the encrypted file segments are stored in a group in containers. In 860, higher-tier segments are stored in a group in containers. In 862, it is determined if there is more than one segment in the next higher tier. If there is more than one segment in the next higher tier, then the top layer has not yet been reached and control passes to 852. If there is not more than one segment in the next higher tier, then the top level of the hierarchy has been reached, and in 864 the prime segment is encrypted using the DM key. In 866, the directory manager file is returned and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for shredding a target file, comprising:
a processor configured to:
receive a first directory manager key;
decrypt a directory manager file using the first directory manager file key, wherein the directory manager file includes an encryption key that is used when reconstructing a target file, wherein the target file is stored as one or more segments in a storage system that deduplicates stored segments, wherein the one or more segments are stored in a plurality of tiers in a hierarchical data structure, wherein a segment encryption key for one of the one or more segments in a lower tier is stored as an encrypted data in a segment in a next higher tier, and wherein the one or more segments are stored in containers, wherein each container includes one or more data segments and metadata;
modify the directory manager file by deleting a reference to the target file, wherein the reference includes the encryption key, and wherein the deletion of the reference to the target file in the directory manager file shreds the target file, wherein shredding the target file makes retrieving the target file impractical;
receive a second directory manager key; and
encrypt the modified directory manager file using the second directory manager file key, wherein the encrypted modified directory manager file is stored in a hierarchical data structure; and
a memory coupled to the processor and configured to provide the processor with instructions.

2. A system as in claim 1, wherein the processor is further configured to receive a directory manager metadata file.

3. A system as in claim 1, wherein the target file encryption key comprises a hash of at least a portion of a content of the file.

4. A system as in claim 3, wherein the hash comprises one or more of the following: an HMAC keyed hash function or a cryptographically secure hash function.

5. A system as in claim 1, wherein the one or more segments are encrypted.

6. A system as in claim 1, wherein the metadata comprises fingerprint data.

7. A system as in claim 6, wherein the metadata comprising fingerprint data are unencrypted enabling deduplication of data segments identified by the metadata without decrypting the data segments.

8. A system as in claim 1, wherein the metadata is based at least in part on the file encryption key.

9. A system as in claim 1, wherein the one or more data segments are locatable based on the metadata.

10. A system as in claim 1, wherein the metadata is computed by a one-way function of the target file encryption key.

11. A system as in claim 10, wherein the one-way function comprises one of the following: exponential modulo p function, the RSA function, the Rabin function, or a one-way function that has been constructed from a block cipher.

12. A system as in claim 11, wherein the block cipher comprises one of the following: DES or AES.

13. A system as in claim 1, further comprising deleting the first directory manager file key.

14. A system as in claim 1, further comprising deleting the target file referred to by the reference.

15. A system as in claim 1, further comprising deleting the metadata corresponding to the target file referred to by the reference.

16. A computer program product for shredding a target file, the computer program product being embodied in a non-transitory computer readable medium and comprising computer instructions for:
  receiving a first directory manager key;
  decrypting a directory manager file using the first directory manager file key, wherein the directory manager file includes an encryption key that is used when reconstructing a target file, wherein the target file is stored as one or more segments in a storage system that deduplicates stored segments, wherein the one or more segments are stored in a plurality of tiers in a hierarchical data structure, wherein a segment encryption key for one of the one or more segments in a lower tier is stored as an encrypted data in a segment in a next higher tier, and wherein the one or more segments are stored in containers, wherein each container includes one or more data segments and metadata;
  modifying the directory manager file by deleting a reference to the target file, wherein the reference includes the encryption key, and wherein the deletion of the reference to the target file in the directory manager file shreds the target file, wherein shredding the target file makes retrieving the target file impractical;
  receiving a second directory manager key; and
  encrypting the modified directory manager file using the second directory manager file key, wherein the encrypted modified directory manager file is stored in a hierarchical data structure.

17. A method for shredding a target file, comprising:
  receiving a first directory manager key;
  decrypting, using a processor, a directory manager file using the first directory manager file key, wherein the directory manager file includes an encryption key that is used when reconstructing a target file, wherein the target file is stored as one or more segments in a storage system that deduplicates stored segments, wherein the one or more segments are stored in a plurality of tiers in a hierarchical data structure, wherein a segment encryption key for one of the one or more segments in a lower tier is stored as an encrypted data in a segment in a next higher tier, and wherein the one or more segments are stored in containers, wherein each container includes one or more data segments and metadata;
  modifying a directory manager file by deleting a reference to the target file, wherein the reference includes the encryption key, and wherein the deletion of the reference to the target file in the directory manager file shreds the target file, wherein shredding the target file makes retrieving the target file impractical; and
  receiving a second directory manager key; and
  encrypting the modified directory manager file using the second directory manager file key, wherein the encrypted modified directory manager file is stored in a hierarchical data structure.

* * * * *